May 14, 1929.　　　H. L. WILSON　　　1,713,110
VEHICLE LAMP
Filed July 9, 1923　　　2 Sheets-Sheet 1
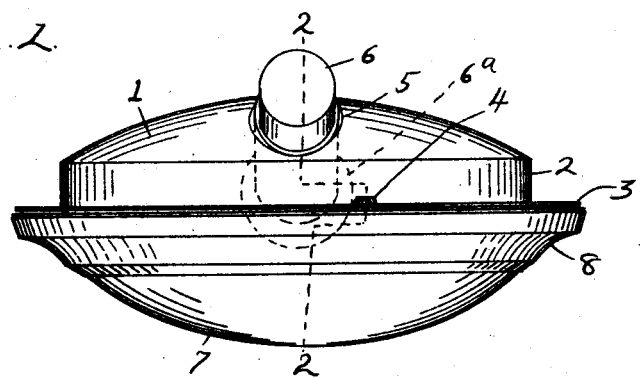
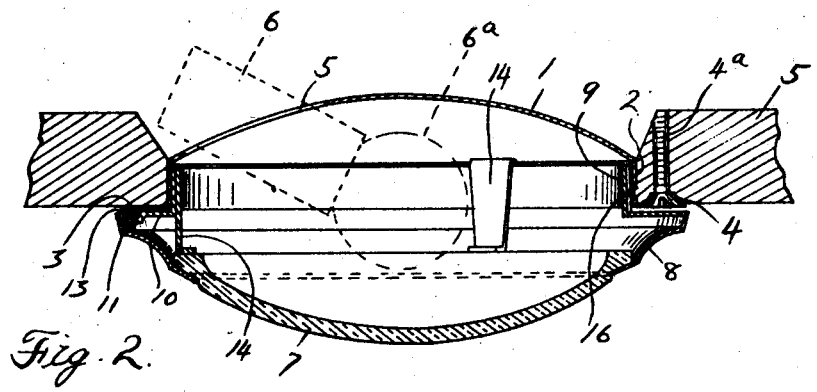
Inventor
Herbert L. Wilson

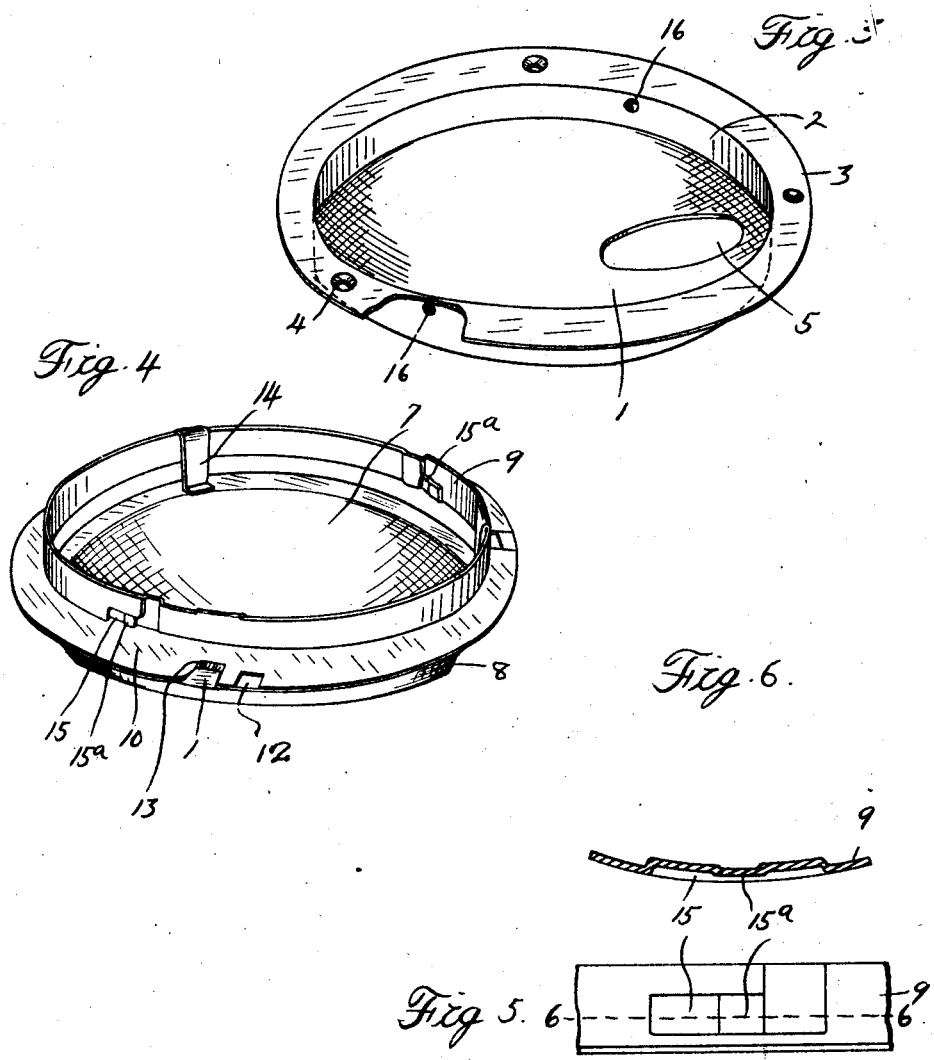

Patented May 14, 1929.

1,713,110

UNITED STATES PATENT OFFICE.

HERBERT L. WILSON, OF TOLEDO, OHIO, ASSIGNOR, BY MESNE ASSIGNMENTS, TO THE DURA COMPANY, OF TOLEDO, OHIO, A CORPORATION OF OHIO.

VEHICLE LAMP.

Application filed July 9, 1923. Serial No. 650,453.

This invention relates to vehicle lamps and particularly relates to lamps for interior use in vehicles of the closed body type.

The invention consists in a novel provision for quick detachably securing the glass lens or dome to a support for the lamp.

In the drawings:—

Figure 1 is a view of the improved lamp construction in side elevation;

Figure 2 is a cross section on line 2—2 of Figure 1;

Figures 3 and 4 are perspective views relatively of the reflector forming bulb support and base of the lamp and of the removable unit including the cover glass;

Figure 5 is a fragmentary enlarged view of a bayonet joint slot formed in one of the parts;

Figure 6 is a cross section on line 6—6 of Figure 5.

In these views, the reference character 1 designates a dished reflector formed of sheet metal with its interior surface preferably polished. Said member has the cylindrical marginal wall 2 from which the annular flange 3 projects outwardly. At suitable points, openings 4 are formed in said flange for engagement by screws 4ª securing the lamp to the top frame 5 of the vehicle. The reflector or back plate 1 is formed with an opening 5 in which is mounted the lamp socket 6 in such a manner as to locate the bulb 6ª engaging said socket in the axial line of the dished reflector. 7 designates the lens or cover glass and 8 an annular sheet metal retainer for said glass. The glass 7 is dished oppositely to the curvature of the reflector 1 and the ring 8 has a curvature conforming to that of said glass. To hold the glass 7 fixed in its proper central position in the retainer 8, there is employed a ring comprising the cylindrical wall 9 and the outwardly projecting flange 10 The ring 9, 10 is interiorly detachably engaged with the retainer 8 and tongues 14 integral with the wall 9 at its upper edge are bent to project downwardly to marginally bear upon the glass 7 and hold the same against the retainer 8. As a preferred means for detachably engaging the ring 9, 10 with said retainer, the latter is formed at suitable spaced points with inwardly projecting or radial lugs 11 and corresponding marginal slots or notches 12 are formed in the portion 10 of said ring. After registering the notches 12 with the lugs 11 the ring 9, 10 is moved toward the retainer 8 so as to seat the tongues 14 upon the glass 7. The ring 9, 10 is then slightly rotated so as to engage the lugs 11 above the flange 10 of said ring. Preferably, pockets 13 are formed in said flange respectively adjacent the notches 12, the lugs 11 being sprung into said pockets. Thus, it is seen that the glass 7, its retainer 8 and the ring 9, 10 are adapted to form a unit, the parts of which are held firmly together. The portion 9 of the ring 9, 10 provides for mounting this unit upon the reflecting back plate 1. Thus, said portion 9 is formed with diametrically opposed indented bayonet joint grooves 15 and a pair of corresponding bosses 16 are indented in the cylindrical wall 2 of the member 1. Thus, by registering the grooves 15 with the bosses 16, the ring member 9 may be inserted into the cylindrical wall 2 of the back plate and a slight rotation of the unit 7, 8, 9, 10 then engages said bosses in the circumferential portions of said grooves. Preferably, the circumferential portions of the bayonet joint grooves 15 are slightly less shallow adjacent the entrance portion of said grooves, as is best indicated at 15ª in Figure 5, so that in completing assembly the bosses 16 will snap into the relatively deep end portions of said grooves and a predetermined resistance to circumferential turning of the removable unit portion of the lamp will be offered by the portions 15ª of the grooves.

The described construction provides for a rapid assembly both of the cover glass or lens in its retainer ring and of the unit comprising said glass and ring with the reflecting back plate. A time economizing feature of the construction is the complete absence of any soldered joints or connections. A further economical feature lies in the use of pressed, stamped, or spun sheet metal for all metallic parts. It is to be observed that all of the assembled parts of the lamp are connected under a stress that will serve to eliminate any rattle. Thus, in the complete assembly, the tongues 14 are under a compression stress pressing the glass 7 against its retainer 8. The lugs 11 are under a stress holding them in the pockets 13 and resisting relative movement of the retainer 8 and the ring 9, 10 and the bosses 16 fit snugly in the bayonet joint slots 15, resisting relative movement.

What I claim as my invention is:—

1. A lamp comprising a base having provision for mounting a source of light, a cover glass coacting with said base to form a container for said source of light, an annular retainer for said glass, and a ring detachably engageable with said base and detachably securing said retainer to said base.

2. A lamp as set forth in claim 1, said base having a cylindrical marginal wall, and said ring having a portion telescopically engaged with said wall.

3. A lamp as set forth in claim 1, said base and ring having telescopically engaged parts, and the ring having tongues projecting toward the glass and marginally bearing thereupon.

4. A lamp as set forth in claim 1, said ring rotatively interlocking with said retainer and being adapted to rotatively interlock with said supporting base.

5. A lamp as set forth in claim 1, said base having a substantially annular flange for engagement by fasteners, and said ring having an outwardly projecting flange fitting within the retainer and interlocking with the latter and seating against said flange of the base in the assembled structure.

6. A lamp as set forth in claim 1, said base having a substantially cylindrical marginal wall, and said ring comprising a cylindrical wall telescopically engaging said marginal wall and having integral tongues to bear upon the glass, said ring further comprising an outwardly projecting portion adapted for interlocking with said retainer.

7. A lamp as set forth in claim 1, said base comprising a dished central portion having an interior reflecting face, a substantially cylindrical marginal portion and a flange outwardly projecting from said marginal portion, said flange providing for attachment of the base to a suitable support, said ring comprising a wall telescopically engaging within the cylindrical portion of the base and further comprising an outwardly projecting flanges, tongues integral with one of said portions, bent to engage the glass to hold the same centrally in its retainer, the latter having lugs projecting radially inward for interlocking with the outwardly projecting flange of said ring.

8. In a lamp, a base formed of pressed sheet metal, a cover glass, a retainer for said glass formed of pressed sheet metal, a pressed metal ring, means on said ring engaging said glass, cooperating means on said retainer and ring for securing said parts together and cooperating means on said base and ring for securing the latter to the former, said three last-mentioned means being under stress in the assembled position of the parts.

9. A lamp comprising a base having provision for mounting a source of light, a cover glass coacting with said base to form a container for said source of light, an annular retainer for said glass, and a ring detachably supporting said glass in said retainer and forming with said retainer and glass, a unit detachable as such from said base.

In testimony whereof I affix my signature.

HERBERT L. WILSON.